W. R. CARSON.
LATCH.
APPLICATION FILED NOV. 27, 1909.
967,103.
Patented Aug. 9, 1910.
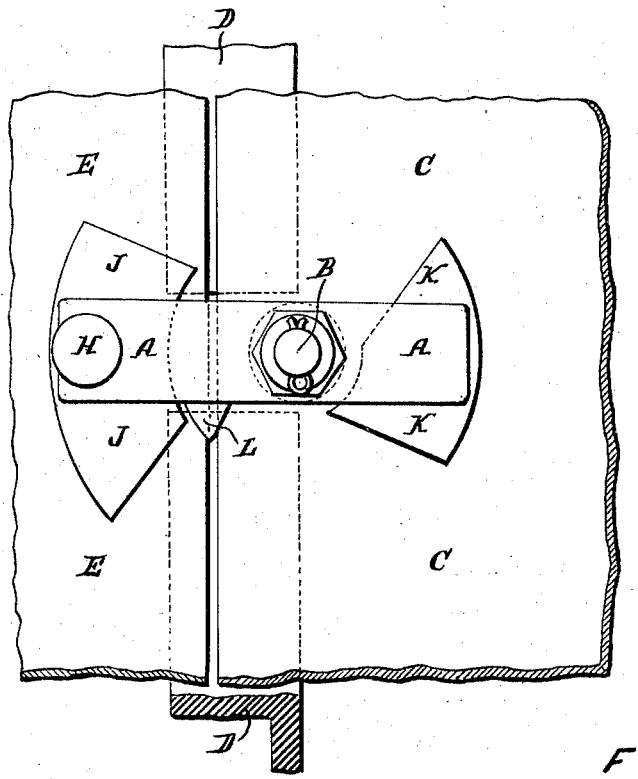
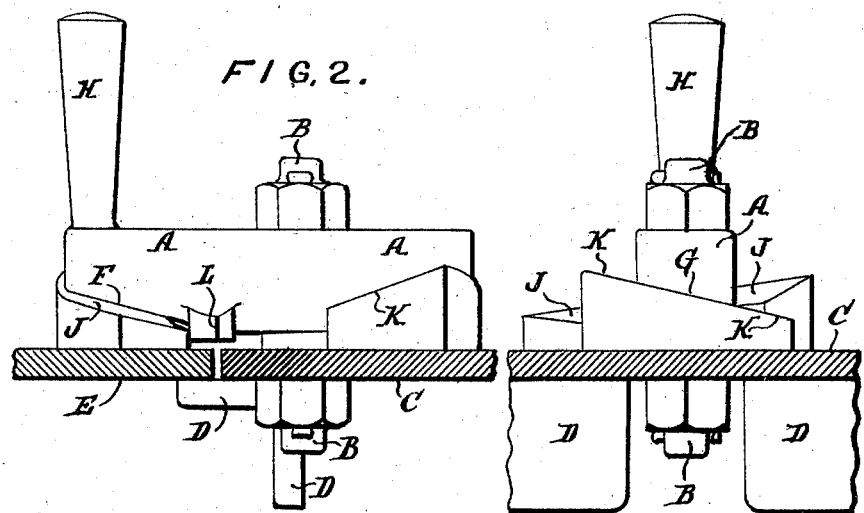
WITNESSES
INVENTOR
William Ralston Carson
BY
Howson and Howson
his ATTORNEYS

UNITED STATES PATENT OFFICE.

WILLIAM RALSTON CARSON, OF GLASGOW, SCOTLAND.

LATCH.

967,103.  Specification of Letters Patent.  Patented Aug. 9, 1910.

Application filed November 27, 1909. Serial No. 530,156.

*To all whom it may concern:*

Be it known that I, WILLIAM RALSTON CARSON, a subject of the King of Great Britain and Ireland, and a resident of Glasgow, Scotland, have invented a certain new and useful Improved Latch, and of which the following is the specification.

This invention has for its object to provide an improved fastening, particularly applicable for securing smoke-box doors, which require not only to be so forced on their seats with sufficient pressure as to render them smoke tight, but which also require to be so held that any expansion which may take place owing to the heat to which they are subjected may not cause them to jam in their seats or be so enlarged that once opened they cannot be effectively closed again. The improved fastening is also applicable, for example, to ships' scuttles or side lights, which require to be so forced on their seats that they are air and water tight.

The fastening consists of an arm so journaled on a pin projecting out from the outer surface of the fixed frame against which the door or window closes, that, when the door or window is closed, the arm may be turned to cause inclined parts on the under side of its outer ends to ride on inclined wedge surfaces on the door, and on the fixed frame, but instead of the inclined surfaces on the ends of the arm and the oppositely inclined wedge surfaces with which they engage being inclined in one direction only, as in hitherto known constructions, these surfaces are inclined in two directions, that is, the inclined surfaces on the arm are not only inclined in the direction of the width of the arm as formerly, but also inclined in the direction of the length of the arm; and similarly the faces of the wedges are not only inclined in the direction of their length as formerly, but also in the direction of their width. When the inclines on the arm are made to engage the wedge surfaces the resultant force exerted is at an angle to the axis of the journal pin, that is, both downward and outward, and the door is thus not only held firmly on its seat, but also prevented from so creeping under the influence of heat that it could jam in its seat or be so enlarged that once opened it cannot be effectively closed again.

In order that the invention and the manner of performing the same may be properly understood there is hereunto appended a sheet of explanatory drawings, showing in Figure 1 a plan, and in Figs. 2 and 3 elevations at right angles to each other of an example of the improved fastening.

As shown in the drawings, the fastening consists of an arm A journaled slightly to one side of the middle of its length on a pin B projecting out from the outer surface of a plate C which is stationary or fixed, and which may be any convenient part of the fixed frame. This plate C carries an angle iron bar D against which the door, window or the like (represented by part of a plate E) closes. The arm A thus projects out on both sides of the axis B, and both ends are made with oppositely inclined wedge surfaces F, G on their under sides. These inclined surfaces are not only inclined in the direction of the width of the arm as formerly, but they are also inclined in the direction of the length of the arm.

The arm A is operated by a handle H projecting out from its outer surface, and when the door E or the like is closed, the arm is turned to cause the inclined surface F on the under side of one end thereof to ride on to an inclined wedge surface J on the outer surface of the door E or the like. This movement of the arm A also makes the wedge surface G on its other end ride on to an inclined wedge surface K on the fixed frame C. Both wedge surfaces J, K are not only inclined in the direction of their length as formerly, but in the direction of their width. The wedge action at opposite ends of the arms A insures that the pin B, on which the arm A turns, is relieved of all diagonal or cross winding stress, as the resulting forces are in axial direction, and the pin is only subjected to tensional stress, and at the same time when the inclined wedge surfaces F, G on the arm are made to engage the wedge surfaces J, K owing to the formation of these surfaces, as hereinbefore described, the resultant force exerted is at an angle to the axis of the journal pin B, that is, both downward and outward, and when the improved fastening is applied in connection with a smoke box door, for example, the door is thus not only held firmly on its seat, but also prevented from so creeping under the influence of heat that it could jam in its seat, or be so enlarged that when opened it could not be effectively closed again.

A stop L is formed on the arm A so that when the fastening is disengaged, this stop encounters the side of the wedge K and prevents the arm turning too far.

What I claim is:—

A fastening device for doors, windows and the like having relatively movable members, comprising a swinging arm mounted on one member and having wedge faces on each side of its pivot, in combination with counterpart wedge surfaces adapted to be simultaneously engaged by said swinging arm, one of said wedges being mounted on the member carrying the swinging arm and the other wedge member being mounted on the relatively movable member, the engaging surfaces of said arm and wedge members being inclined both transversely and in the direction of their length, substantially as described.

In testimony whereof I have signed my name to this specification, in the presence of two subscribing witnesses.

WILLIAM RALSTON CARSON.

Witnesses:
 WILFRED HUNT,
 JAMES EAGLESOM.